United States Patent [19]
Hauser

[11] Patent Number: 5,583,802
[45] Date of Patent: Dec. 10, 1996

[54] METHODS AND DEVICES FOR PERFORMING ARITHMETIC OPERATIONS IN THE MANNER AND WITH THE FUNCTION OF AN ELECTRONIC CALCULATING MACHINE

[76] Inventor: Walter Hauser, Ruchacher, CH-8914 Aeugst am Albis, Switzerland

[21] Appl. No.: 200,286

[22] Filed: Oct. 5, 1993

Related U.S. Application Data

[63] Continuation of Ser. No. 490,639, filed as PCT/CH90/00079, Mar. 23, 1990, abandoned.

[30] Foreign Application Priority Data

| Mar. 23, 1989 | [CH] | Switzerland | 1083/89 |
| Jun. 5, 1989 | [CH] | Switzerland | 2094/89 |
| Jun. 11, 1989 | [CH] | Switzerland | 2164/89 |
| Aug. 14, 1989 | [CH] | Switzerland | 2961/89 |
| Aug. 16, 1989 | [CH] | Switzerland | 2990/89 |
| Aug. 16, 1989 | [CH] | Switzerland | 2991/89 |
| Aug. 18, 1989 | [CH] | Switzerland | 3009/89 |
| Aug. 26, 1989 | [CH] | Switzerland | 3081/89 |
| Sep. 19, 1989 | [CH] | Switzerland | 3393/89 |
| Oct. 11, 1989 | [CH] | Switzerland | 3698/89 |

[51] Int. Cl.$^6$ ................................. G06F 3/00
[52] U.S. Cl. ................................. 364/709.11
[58] Field of Search ............... 364/705.2, 705.6, 364/709.01, 709.04, 709.11, 709.13, 709.16; 382/66–68, 9; 235/740

[56] References Cited

U.S. PATENT DOCUMENTS

| 4,016,411 | 4/1977 | Genin | 364/709.12 |
| 4,041,454 | 8/1977 | Shepard et al. | 382/66 |
| 4,091,270 | 5/1978 | Musch et al. | 235/419 |
| 4,473,886 | 9/1984 | Rizk et al. | 364/709.16 |
| 4,475,165 | 10/1984 | Rizk et al. | 364/709.16 |
| 5,089,980 | 2/1992 | Bunsen et al. | 364/709.07 |
| 5,093,868 | 3/1992 | Tanaka et al. | 382/9 |
| 5,120,944 | 6/1992 | Kern et al. | 235/470 |
| 5,301,243 | 4/1994 | Olschafskie et al. | 382/67 |

OTHER PUBLICATIONS

Patents Abstracts of Japan, vol. 6, No. 221 (P-153) (1099), 5 Nov. 1982, & JP.A. 57125471 (Sharp L.L.), 04 Aug. 1982.

*Primary Examiner*—Roy N. Envall, Jr.
*Assistant Examiner*—Chuong D. Ngo
*Attorney, Agent, or Firm*—Oblon, Spivak, McClelland, Maier & Neustadt, P.C.

[57] ABSTRACT

A method for automatically entering digits and arithmetic operations into a calculator. After digits are entered manually or by an optical character recognition device, the numbers are delimited (or separated) automatically to avoid the need to depress an enter key or operation key. The operation can also be determined automatically either by a single input for a series of repeated operations or by determining the direction of the scan in a character recognition device. The delimiting of the numbers will be determined based on spatial arrangements, minimum time differences between numbers or by using alternate keypads. The size of the reading zone may be adjusted either mechanically or electronically to avoid reading undesired numbers.

10 Claims, 13 Drawing Sheets

METHODS AND DEVICES FOR PERFORMING ARITHMETIC OPERATIONS IN THE MANNER AND WITH THE FUNCTION OF AN ELECTRONIC CALCULATING MACHINE

This application is a Continuation of application Ser. No. 07/490,639, filed Dec. 07, 1990, abandoned, which was filed as International Application No. PCT/CH90/00079 on Mar. 23, 1990.

BACKGROUND OF THE INVENTION

1. Field of the Invention

This invention generally relates to a method for entry of data and arithmetic operations into an machine with calculating functions and more particularly to a method for entry of figures and arithmetic operations with automatic delimitation of figures, calculation of a result and automatic selection of operations.

2. Discussion of the Background

Calculators and similar mathematical machines utilize figures in an electronic form. Such figures can be input directly if they are generated from other electronic equipment. However many figures must be input directly from paper form. While the processing of electronic data by a machine for electronic data processing is very fast, the manual input of data by a keypad to form the electronic data is comparatively slow, not very effective and fatiguing.

Although direct input of electronic information is increasing, paper is still widely utilized as a data carrier since it has the advantages of being fixed and relatively permanent. Unfortunately, before such information can be utilized it must be transformed into electronic format.

While humans are capable of intelligent thought and of several methods of communication, the human processing of visual information to form electronic data is not very effective. Accordingly, where humans and machines interact, the translation of knowledge on the part of humans into data that the machines can understand is an area of reduced effectiveness.

One particular area where this is true is where numbers must be entered for calculation into a machine with calculating functions. The numbers must be read off a sheet and transformed into electric signals such as by using a keypad to form the input to an electronic calculating machine. This operation is slowed, not only by the time it takes for the operator to read and interpret the numbers, but by the necessity for the operator to indicate the end of (or delimit) one number before progressing to the next number or calculating the result. Likewise, it is necessary to indicate for each figure a particular arithmetic operation, an enter command or result command which must be performed for each number.

SUMMARY OF THE INVENTION

Accordingly, one object of this invention is to provide a novel method for effectively and accurately inputting data into an machine with calculating functions and for effectively calculating the result.

Another object of this invention is to provide a novel method for delimiting numbers for entry into an machine with calculating functions.

Another object of this invention is to provide a novel method for indicating arithmetic operations for an electronic calculator.

A still further object of this invention is to provide a novel method for entry of digits and arithmetic operations as an input to an machine with calculating functions and for calculation of the result with a small number of keystrokes.

A still further object of this invention is to provide a novel method for automatically delimiting the digits of a number being read by a character recognition for inputting figures and operations into a machine with calculating functions.

Another object of the invention is to provide a novel method for automatically delimiting numbers and storing the same in memory in a calculating device.

Another object of this invention is to provide a novel method utilizing two keypads to alternately input numbers.

A still further object of this invention is to provide a novel method for the input of digits by a character recognition device utilizing the direction of movement of the scanner to indicate the arithmetic operation.

A further object of this invention is to provide a novel method for calculating the result of figures entered into a calculating machine with no manual instruction input for the result after the last digit of a figure has been entered.

Another object of this invention is to provide a novel method for effectively entering figures and operations into a machine with calculating functions and for effectively calculating the result, the figures and operations being entered manually by a keypad.

A further objection of this invention is to provide a novel method for indicating and performing arithmetic operations to figures when utilizing a machine with calculating functions.

Another object of this invention is to provide a novel method for indicating and performing arithmetic operations wherein one of said operations is sequentially performed a plurality of times to a series of figures when utilizing a machine with calculating functions.

A further object of this invention is to provide a novel method for indicating and performing arithmetic operations wherein different arithmetic operations are performed to a series of numbers when utilizing a machine with calculating functions.

Briefly these and other objects of the invention are achieved by providing a method of operation of a calculator where the numbers are delimited by various criteria. The criteria may be a time difference or spatial difference between digits or the use of alternate keypads. In addition, the type of arithmetic operation performed may be input only once and automatically reused without the need to enter the operation after each number. The operation may also be determined by the direction of movement of the scanner in connection with a character recognition device.

This invention is intended to help humans input data to a calculating machine and to improve the machines performance by removing the necessity to separately indicate the end of a number or repeatedly indicate the arithmetic operation. Where an operation is performed repeatedly on a series of numbers, the method requires the operation to be input only once or not at all. Thus, if a column of numbers is to be added, either the add operation key can be indicated once followed by the input of the numbers, or the direction of scanning in a character recognition device can be utilized to indicate the operation. Thus, this feature may be utilized either by manual input of digits or by the use of an optical character recognition device. The necessity to enter the digits of figures manually can be avoided if an optical character recognition device is utilized for reading in the digits while performing the methods according to the invention.

In any input method for a calculator, certain general steps must be followed:

1. Recognizing individual digits of the number.
2. Inputting the digits.
3. Delimiting the digits in each number.
4. Inputting the arithmetic operation.
5. Assigning the operation to the specific numbers.
6. Performing the arithmetic operation.
7. Checking the result.

These basic steps are performed regardless of whether an operator inputs information by way of a keypad or whether an optical character recognition device is utilized. In the former case, recognition of digits, the input of the digits, and the input of the operation type is done manually by the operator.

Recognition of the following principles helps to understand this invention. First, all steps of the same type can be performed in one processing step. Secondly, steps can be combined with one another so that the execution of one step automatically effects the performance of the other step. Third, the performance of one step can be carried out automatically by a technical device.

Previously the delimiting of numbers was done manually by inputting an enter key or similar key. The result was calculated by pressing a result key. The present invention avoids this by automatically recognizing delimiting numbers without the need to separately press additional keys. This improves the speed of which numbers can be entered.

Available calculators have keypads for manually entering digits and manually delimiting figures by for example an enter key, operation key or result key.

Entering figures, for example by a Hewlett-Packard scientific calculator, is done by entering the individual digits and pressing the Enter key each time a last digit of a figure has been entered, by this delimiting and entering the figure. This step of having to enter separately the Enter key is automated by the invention. The user only has to enter the digits, the figure is delimited and entered automatically, without any manual instruction input between two figures.

In other calculators, entering figures and operations is done by entering manually first the digits and then the operation or by first inputting the operation and then the digits of a figure and pressing the key for result after the last digit of the last figure has been input. The digits are delimited to the figure each time when an operation or result key is manually pressed. According to one method of the invention, first the operation and then the digits of the figure are similarly input, but the digits of the figure are again not delimited by pressing a key between two figures or after the last figure. The digits are automatically delimited, without a manual instruction input for the delimitation of each figure, and the result is automatically calculated after each figure, without having to enter a manual instruction input for result each time when a result should be calculated or displayed.

Calculators have been suggested with OCR software, by which first the digits of a figure are read in by a horizontal movement, followed secondly by a manual input for the operation or result each time when digits of a figure have been read in, by this delimiting the figures formed by the digits, again manually between or after the figures. It was not thought of having done this delimitation automatically in a simple way by the inventive procedure, that is by delimiting automatically the figures, formed by said digits, by automating the manual instruction input for delimitation of at least one figure, for example by the time-discriminant method, and thus without instruction input for each figure. The same is valid for calculating with bar-coded figures as is shown in U.S. Pat. No. 4,091,270 (Electronic Calculator With Optical Input Means): The bar-coded figure on a document is followed by a bar-coded sign for enter, by this again having to make a separate manual input between the two figures, as the bar-coded sign has to be additionally read in horizontally by the bar-code reading device, instead of automatically delimiting the bar-coded figures by for example the inventive space discriminant method. While this U.S. Patent is applicable for bar-coded figures only, the invention can be applied to both, all uncoded figures read in from documents, and to manual input of digits. There are in fact much larger application possibilities for this invention, which, in addition, do not need any preparation on the document, as it is necessary for the U.S. Patent, where the entry sign has to be printed in a bar-coded form on a document.

PCT application PCT/CH91/00191 with priority date Sep. 5, 1990, discloses entry of figures and operations into a calculator, where the delimitation of digits in a figure is done by pressing the key for the last digit of a figure longer then a preset time interval when inputting the last digit of a figure. This idea is somehow similar to the invention as it represents also automatic delimitation of figures. It can also be utilized for performing some methods of this invention, such as for automatic delimitation without manual instruction input. With PCT application CH/91/00191, figures are also delimited automatically but in another new way, by pressing a digit key longer then a preset time interval, thus still with a manual instruction input for delimitation of the figure and clearly distinguishable from this invention.

The new method, in which no manual instruction input for delimitation of each figure is necessary at all, is clearly distinguishable from existing calculators, from U.S. Pat. No. 4,091,270 and from PCT application CH/91/00191.

The new method of the invention has three steps which clearly show the way of the solution: Only entering digits, delimiting automatically the figures by automating the manual instruction input for delimitation of at least one figure, then performing the operations after the automatic delimitation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
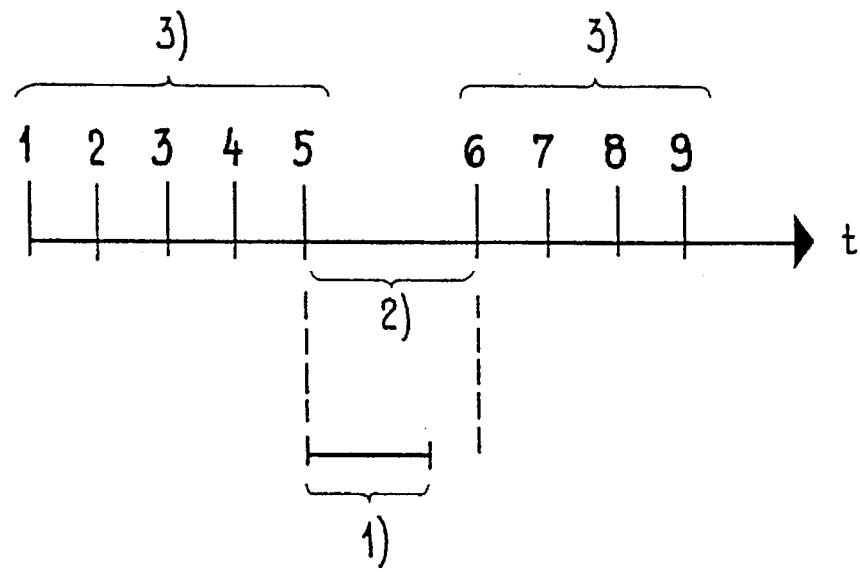
FIGS. 1A and 1B show a first embodiment where a series of numbers are delimited by time or space intervals.
Figure 1B:
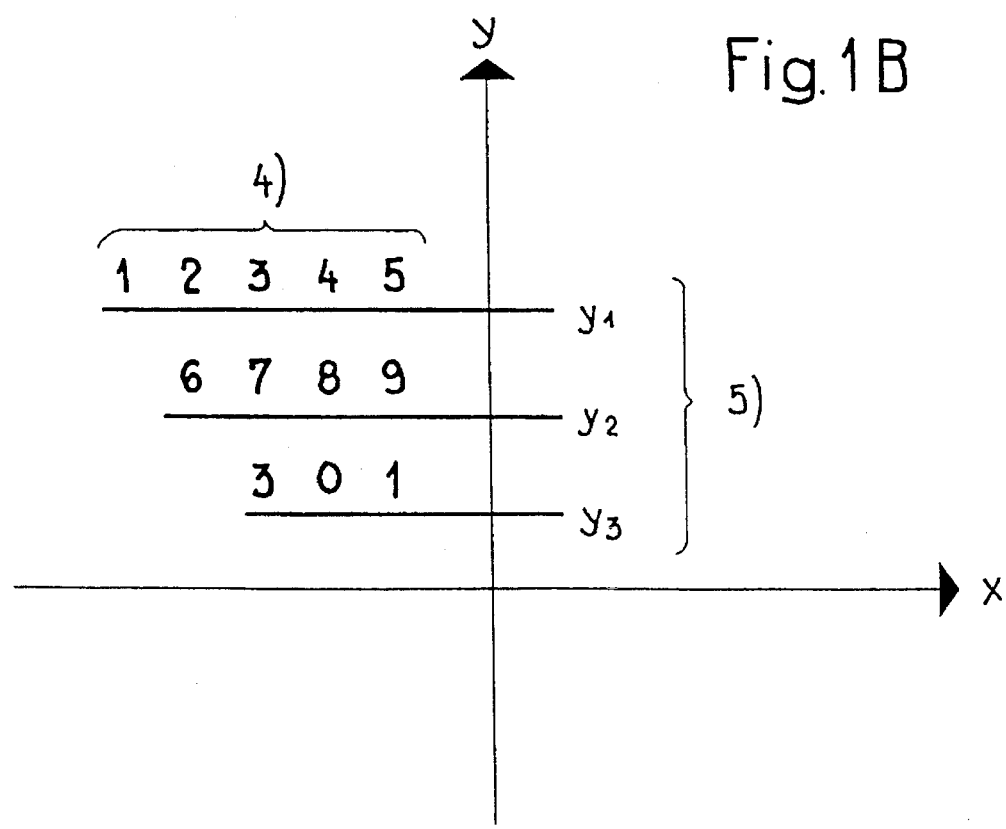

Referring now to the drawings, wherein like reference numerals designate identical or corresponding parts throughout the several views, FIGS. 1A and 1B show a method of automatically delimiting numbers. In FIG. 1A, two numbers 3 are shown, one of which contains five digits and one of which contains four digits. In order to separate the two numbers automatically, it is only necessary to see that a time interval 2 separates the two groups of digits. It is possible to automatically delimit the numbers (that is, separate the digits into numbers) by recognizing that this time interval is greater than a preset time interval 1. Likewise, in FIG. 1B, a similar delimiting may be determined among the numbers 4 according to their spatial arrangement. In this case, they are arranged on separate lines 5, called Y1, Y2, and Y3. Thus, according to the present invention, the digits of a number are not delimited by the manual pressing of an operation key or an enter key, but instead the numbers are delimited automatically. This speeds up the operation of the entry and allows the operator to pay full attention to the digits.

Thus, the automatic delimiting by automating the manual instruction input for delimitation of numbers may take place by looking for a set time interval, a certain spatial arrangement or may be determined by defining a number of digits which should be expected after a comma. This input system may be utilized either for manual input or by using an optical character recognition device. Another method which may be utilized only by manual input is by the use of two separate keypads which are alternately used for consecutive numbers. Thus, entry of the complete figure is recognized by the movement of the data input to the other keypad.

Many advantages are evident by utilizing these principles. The first is the elimination of a manual pressing of an enter key as done in those methods where the numbers are manually delimited by that key. The second is the elimination of a manual pressing of a result key in those prior art methods where operations are entered before the figure and the result command afterwards. The third is that where a series of numbers utilize a repeated operation, for example where a column of numbers are to be added, it avoids the necessity to repeatedly press the operation key. According to the present invention either the operation is automatically assigned or a single input of the operation key is stored so that it is automatically carried out each time a figure is automatically delimited.

Figure 2A:
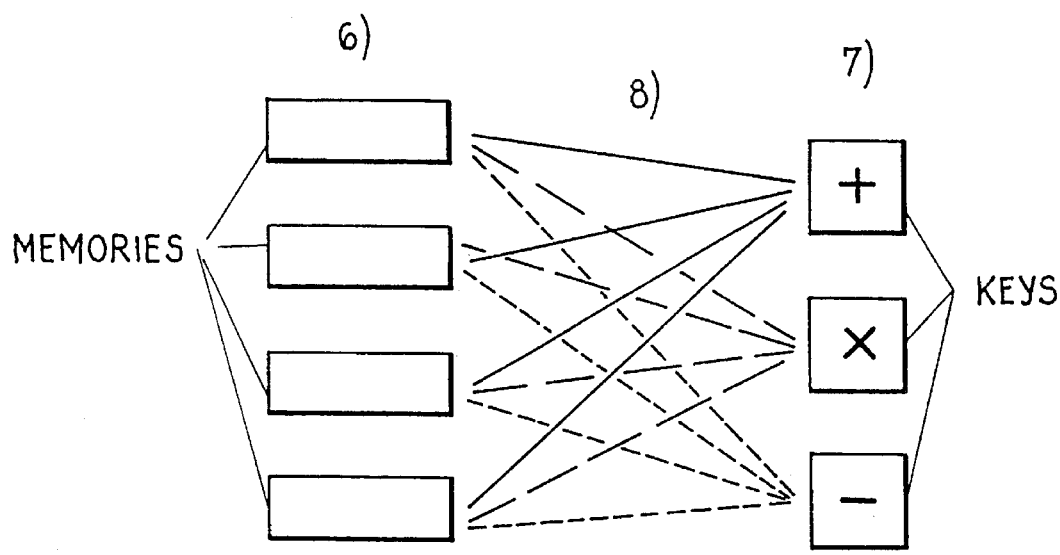
FIGS. 2A and 2B show another embodiment where numbers are stored in memories and automatically operated on sequentially.
Figure 2B:
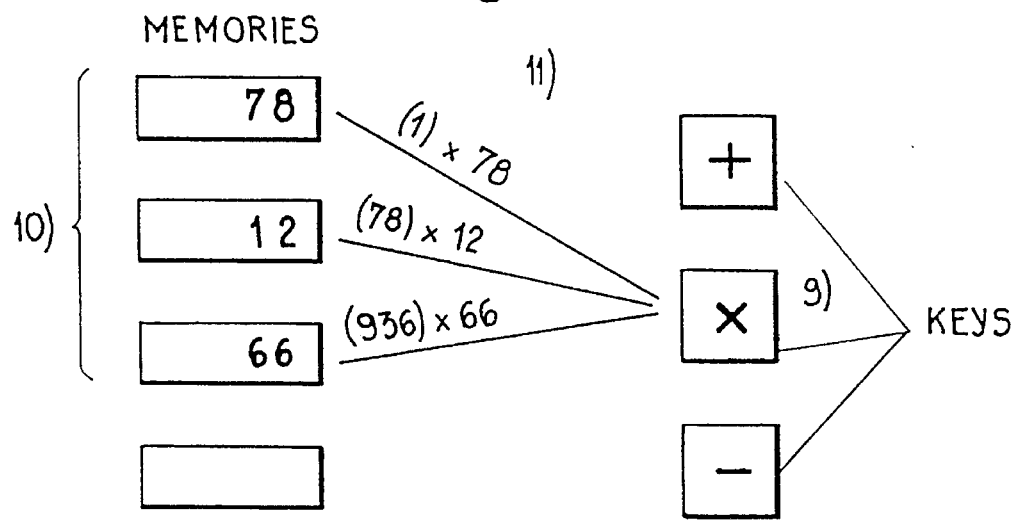

Similarly, as shown in FIG. 2A, memory 6 may be provided for storing figures which have operative connections 8 to operation keys 7. By pressing a key for a specific operation, the operation is performed automatically for each stored figure. Thus, in FIG. 2B, the multiplication operation is applied sequentially by connections 11 to the numbers 78, 12 and 66 which are stored in memory 10.

As can be seen, in utilizing these procedures, the operation key must be pressed either not at all or at most one time resulting in a saving of effort and time. Thus, the manual or automated input of digits automatically causes the delimiting of the numbers without any additional manual instruction input for delimitation of figures, so that in case of manual input of digits the fingers on the digit keys no longer have to be moved to either an operation or enter key. The position of the fingers on the digit keypad remains more constant and allows for better concentration of the operator in following the numbers to be entered and in checking the entered numbers. In case of automatic input by a character recognition device, neither a hand nor a finger has to be moved from the reading device to an operation or result key.

In a situation where a series of arithmetic operations occur which are not all the same, the use of the operation keys can be still be reduced by storing one operation and utilizing it if no key is pressed manually. If no operation is stored, the device may automatically utilize a built in preferred operation, such as addition.

Figure 4A:
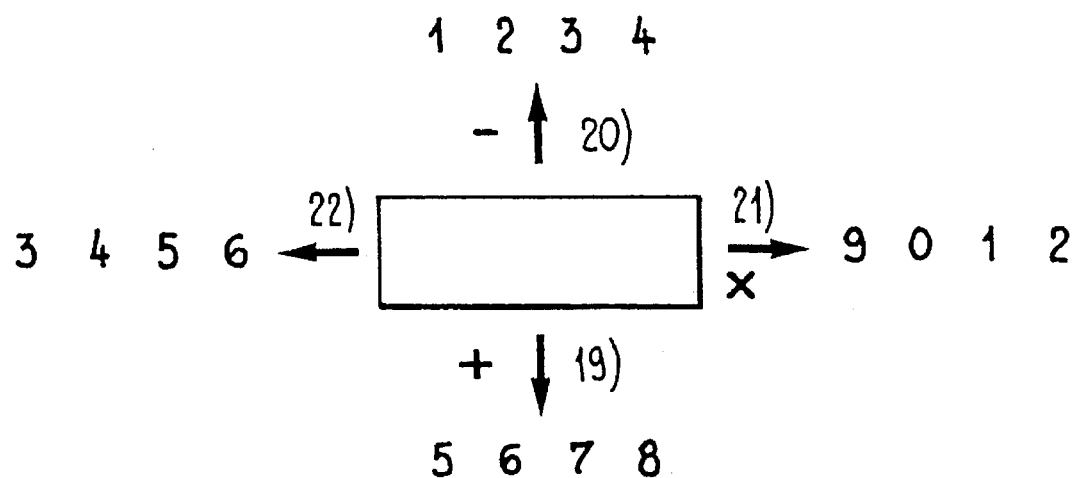
FIGS. 4A and 4B show another embodiment where the direction of reading of numbers automatically indicates the operation desired.
Figure 4B:
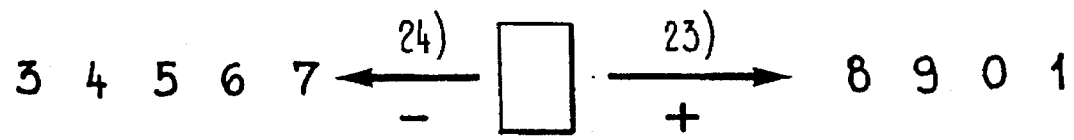
Figure 11:
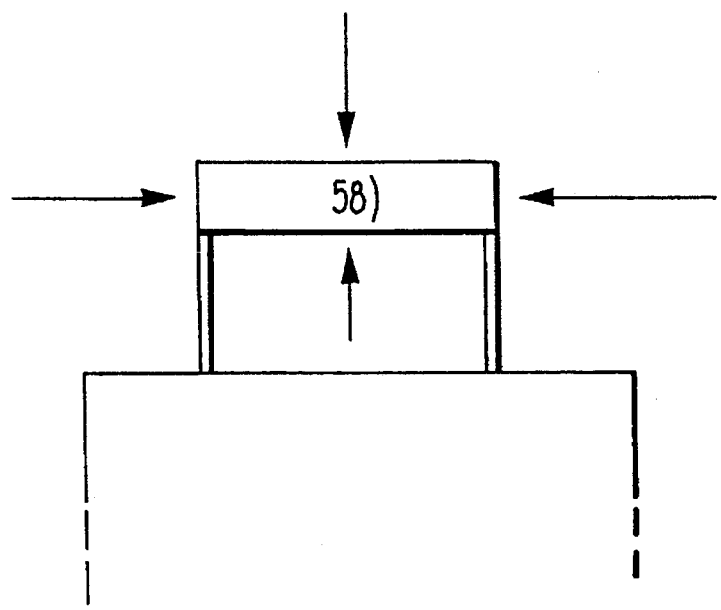
FIGS. 11A and 11B indicate how directions of movement of the scanner determine operations.
Figure 11:
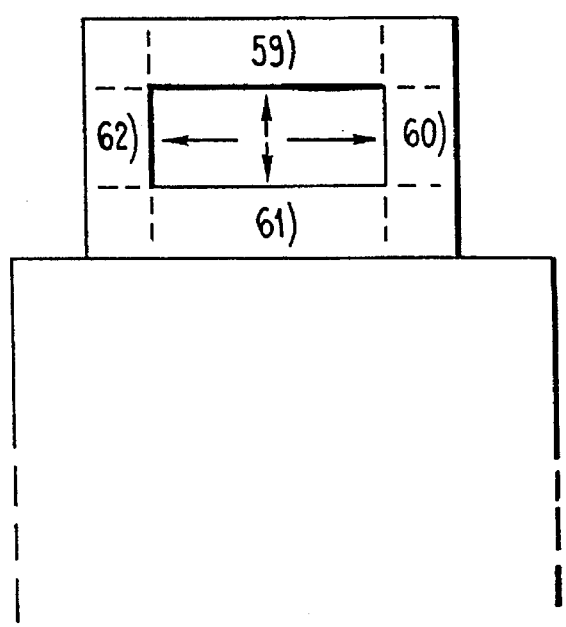

The input of an operation may be simplified even further if an optical character recognition device is utilized to input the data. The movement direction of the device while reading the figure is detected and used to determine the arithmetic operation. For example, the movements of up, down, left and right can be assigned to addition, substraction, multiplication and division. (See FIG. 11A and 11B). This is shown in relation to actual numbers in FIG. 4B. There, the reading of number 24 from right to left indicates that it should be subtracted while reading of number 23 from left to right indicates addition. This is a very simple way of adding and subtracting numbers without having to enter each operation. FIG. 4A likewise shows how four different movements can be used for addition, subtraction, multiplication and division. Thus, number 20 is read from bottom to top indicating subtraction while number 19 is read from top to bottom indicating addition. Number 21 is read from left to right indicating multiplication while number 22 is read from right to left indicating division. This determination of operation utilizing directional movement may be done automatically or may be as a back-up only if a manual input key is not pressed.

Figure 5:
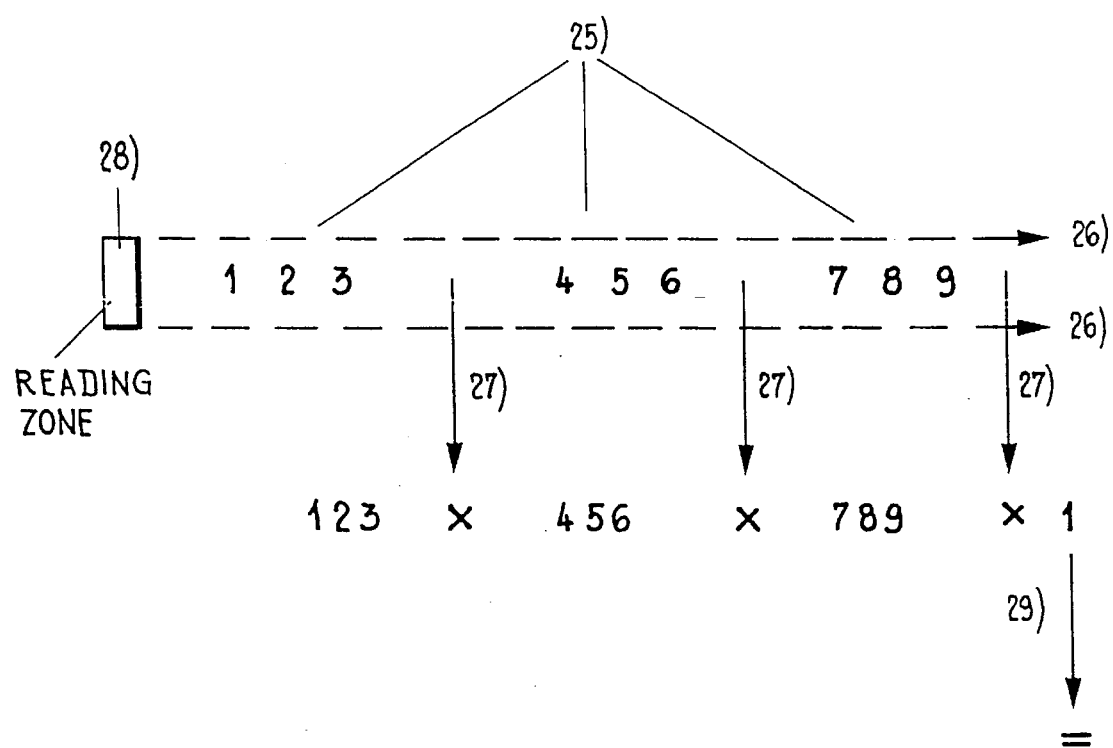
FIG. 5 shows the method of FIG. 4 applied to a sequence of horizontally arranged numbers.

In devices with a plurality of memories, it is also possible to assign a recorded figure to a particular memory as one of the functions of the movement direction or as a separate key entry. FIG. 5 shows this operation utilized on a series of horizontally arranged number 25 where the movement of reading is done in the downward direction indicating that the three numbers should be multiplied together.

Figure 6:
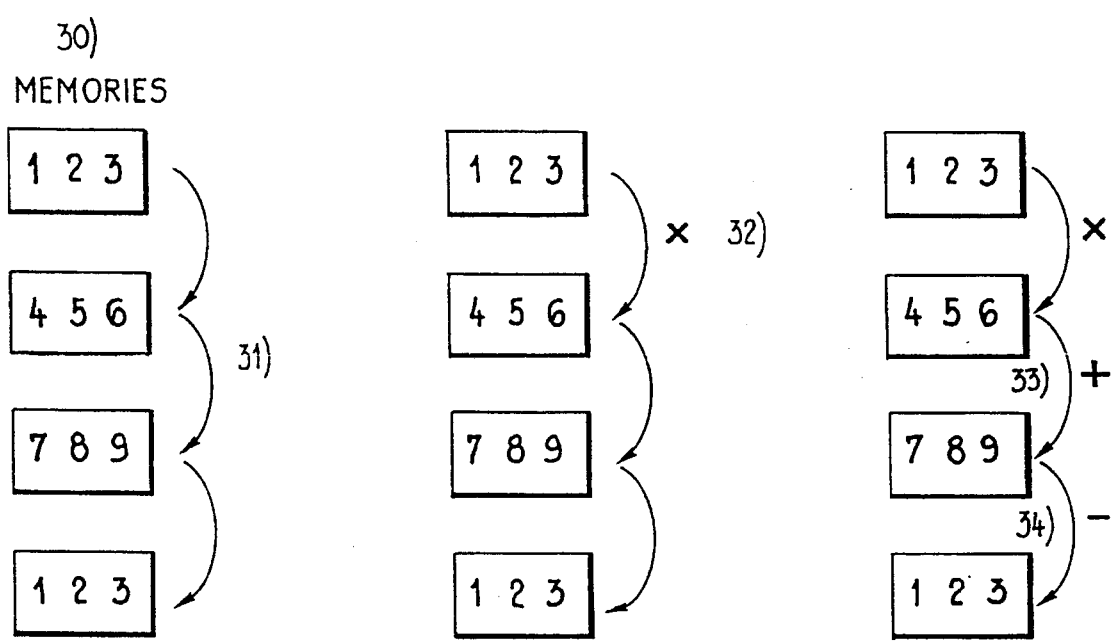
FIG. 6 shows an embodiment utilizing the storage of numbers to indicate the operations desired.
Figure 7:
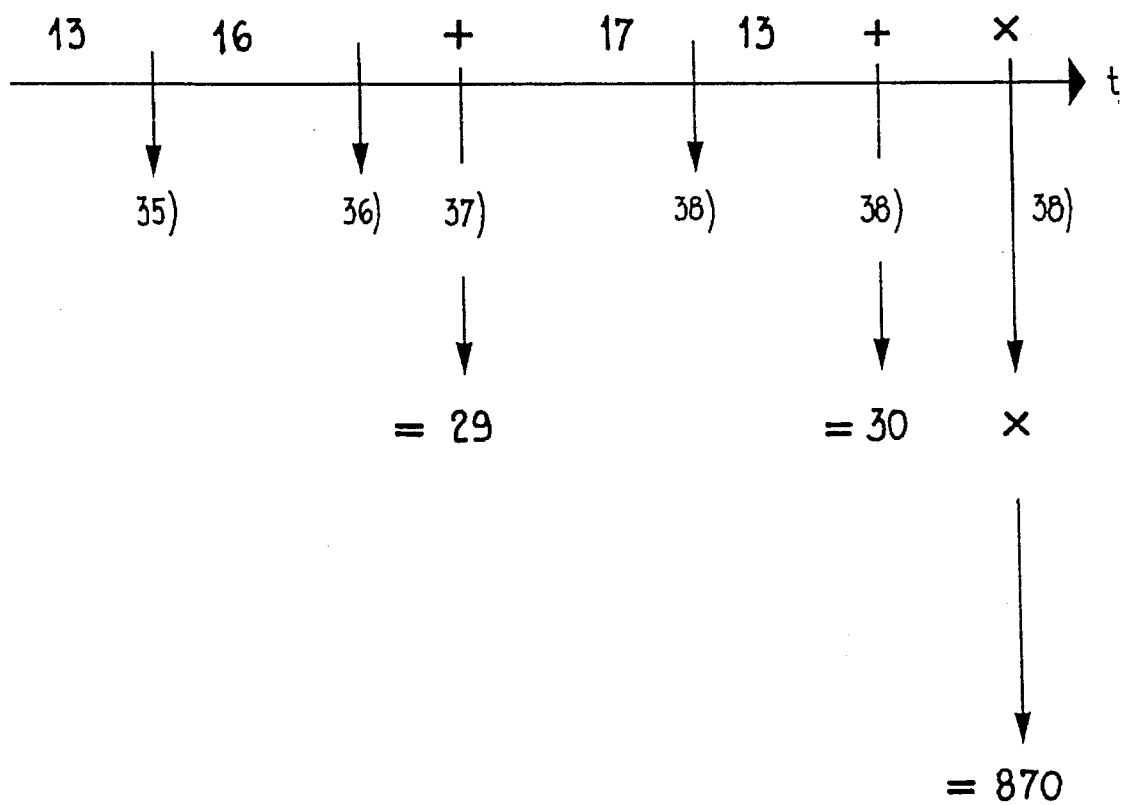
FIG. 7 shows an implementation of the embodiment of FIG. 6 through a sequence of horizontally arranged numbers.

It is also possible to utilize this invention in regard to mixed arithmetic operations, that is where different operations are performed on different numbers in sequence, either for manual input of digits or with an optical character recognition device. The number read may be stored in memory 30 such as shown in FIG. 6. The particular storage location is determined by the operator. The order of storage 31 is determined so that various operations will occur in a specific order. For example, the first stored number 123 and the second number 456 are multiplied together by operation 32. The result of this is then added to the third number 789 in an addition operation 33 and the fourth number 123 is then subtracted from the result in the substraction operation 34. Thus, the operation utilized depends on the location of the storage. The stored figures can be displayed on a screen for the convenience of the operator and for checking. Thus, the storage not only results in the holding of the number, but also the particular storage order determines the operation utilized.

When applying a method where the operation is first entered and then the digits of a figure afterwards as per some prior art methods, the depressing of the result key is no longer necessary with the invention, because the last figure is also delimited automatically, without manual instruction input, and this automatically results in performing the operation and thus in calculating the result. The result is not only calculated automatically after the last digit of the last figure but also every time after each figure has been automatically delimited. A simple and convenient method is achieved if for this method the entered operation is not only stored for the calculation by the next delimited figure but is stored for the calculation by the next delimited figure and is stored as long as not countermanded by the entry of another operation. This allows it to go on calculating without having to enter any operation as long as the figures entered are to be processed by the same stored operation. If another operation has to be performed, the operator will enter the new operation which will be stored instead and will be applied to all next delimited figures, again as long as no other operation is input. Each figure is delimited automatically and the result calculated automatically also, both without a manual instruction input. An operation has to be input only once if it has to be performed sequentially on figures.

Another use of this invention is to place numbers recognized by an optical character recognition device into a fixed electronic data processor so the further processing is accomplished after the arithmetic processing so that the input has to be accomplished only once. Thus, arithmetic combinations do not have to be programmed but can be practiced spontaneously. Thus, the automated reading of numbers from documents may be combined with electronic calculation so as to avoid the need to separately program for the evaluation of recorded values. Thus, the calculation algorithm present in the device automatically processes the data as the scanner is guided over the material.

Figure 3A:
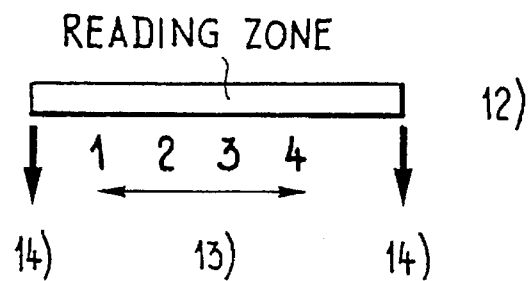
FIGS. 3A and 3B show an embodiment utilizing an optical character recognition device where an addition operation is applied automatically to a series of vertically arranged numbers.
Figure 3B:
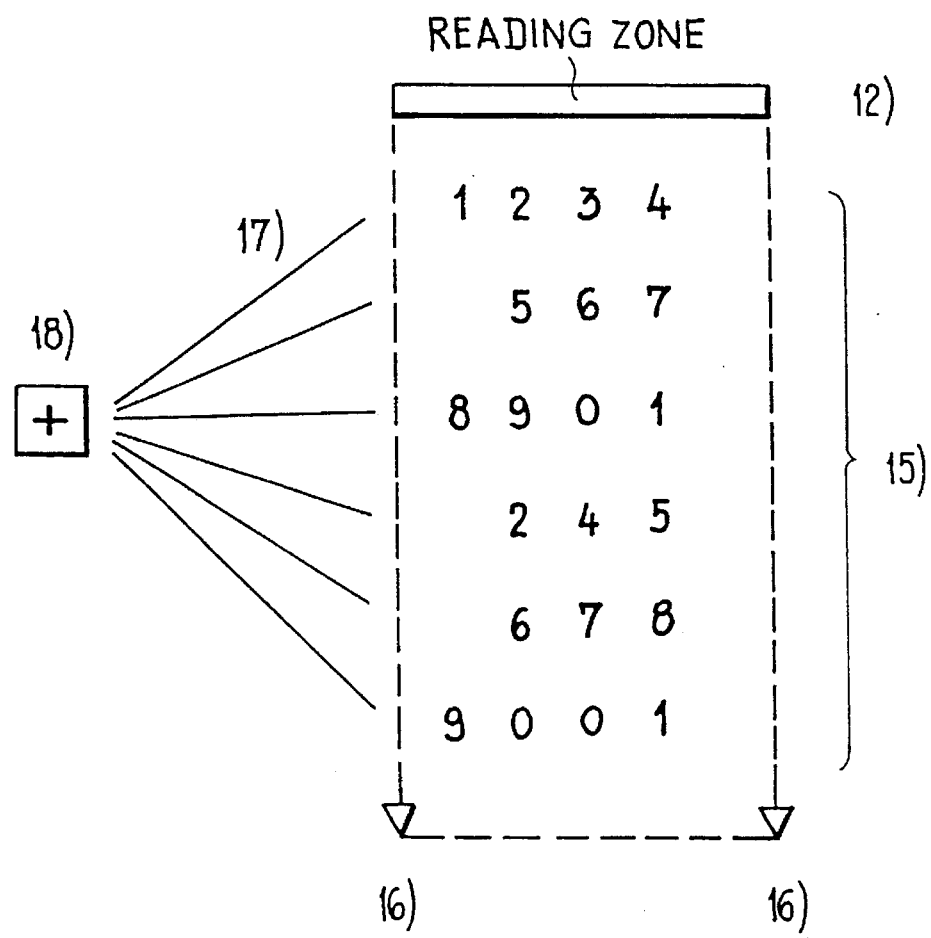

Further, the invention can be utilized in a method where individual numbers are recognized by an optical character recognition device which has a reading zone. As seen in FIG. 3, the reading zone is of a size at least as big as the number to be processed in the horizontal direction 13 with the numbers being arranged vertically 14. Vertical recording is preferred since the recording path can be shortened to the height of the figures. This method is extremely suitable for adding a column of numbers in written form. In FIG. 3B, the column of numbers 15 is recorded by moving the horizontally oriented reading zone 12 vertically 16 so that the digits are recognized and automatically delimited. The addition operation 18 is automatically assigned to the figures pressing the operation key once or by automatic determination of the direction of movement. The various numbers are combined 17 with one another to reach a result.

If re-addition has to be done or other result has to be checked, the calculated result can be automatically checked by reading in also the written result and pressing a particular key or by recognizing a line in the column of numbers. The addition of the numbers is automatically checked for agreement with the first result and a warning signal is generated if they do not agree.

Figure 10:
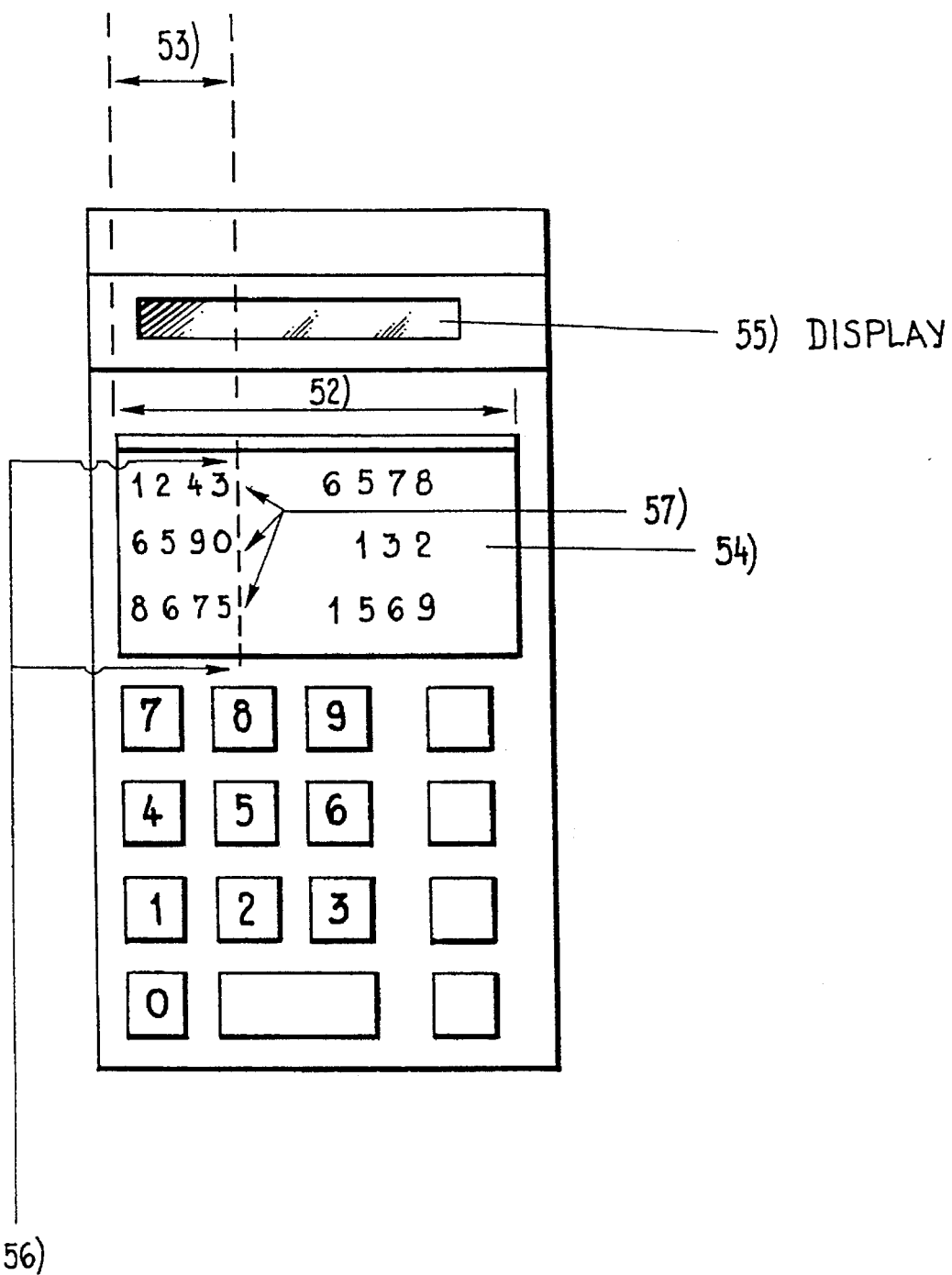
FIG. 10 shows a device for scanning numbers and displaying the same.

In utilizing the method of FIG. 3, the recording path is limited to the height of the column of numbers and is considerably reduced in comparison with a horizontal list of numbers. In the horizontal arrangement the operator must be certain that each number is correctly delimited which requires either a high degree of concentration or additional equipment. As seen in FIG. 5, each of the numbers 25 must be scanned in a manner separating each number or by indicating by a downward movement 27 that they should be multiplied together to give a result 29. On the other hand, vertically arranged numbers can be simply differentiated by their spatial arrangement. An apparatus for performing such a method is shown in FIG. 10 and includes a reading zone 52 which is at least as wide as a column of numbers. This permits the recording of virtually all columns of numbers in written form. The device also contains an arithmetic unit for performing the various arithmetic operations, a device for automatic delimitation of digits and a display 55 for representing the result or input of numbers and operators from the keypad. Although this figure shows such functions all being integrated into a single unit, some of these may be separately located so that the size of the scanner may be reduced. A cable may be connected between the parts for transmittal of signals.

The device in FIG. 10 can be provided with a window through which the numbers in the columns can be seen. This allows for easy checking of the input digits. The reading zone may be arranged so that it can also be read horizontally.

It can be difficult regardless of whether the numbers are arranged in the vertical or horizontal direction, to not accidentally scan digits which are not part of the number. A method can be employed so that the reading zone is adjusted mechanically to the necessary size by means of a slider or electronically so that the undesired figures are not processed. This size is indicated by 53 in FIG. 10. The size of the scanning zone can be displayed so that the relationship between the reading zone 56 and the numbers being scanned is easily seen.

Figure 8A:
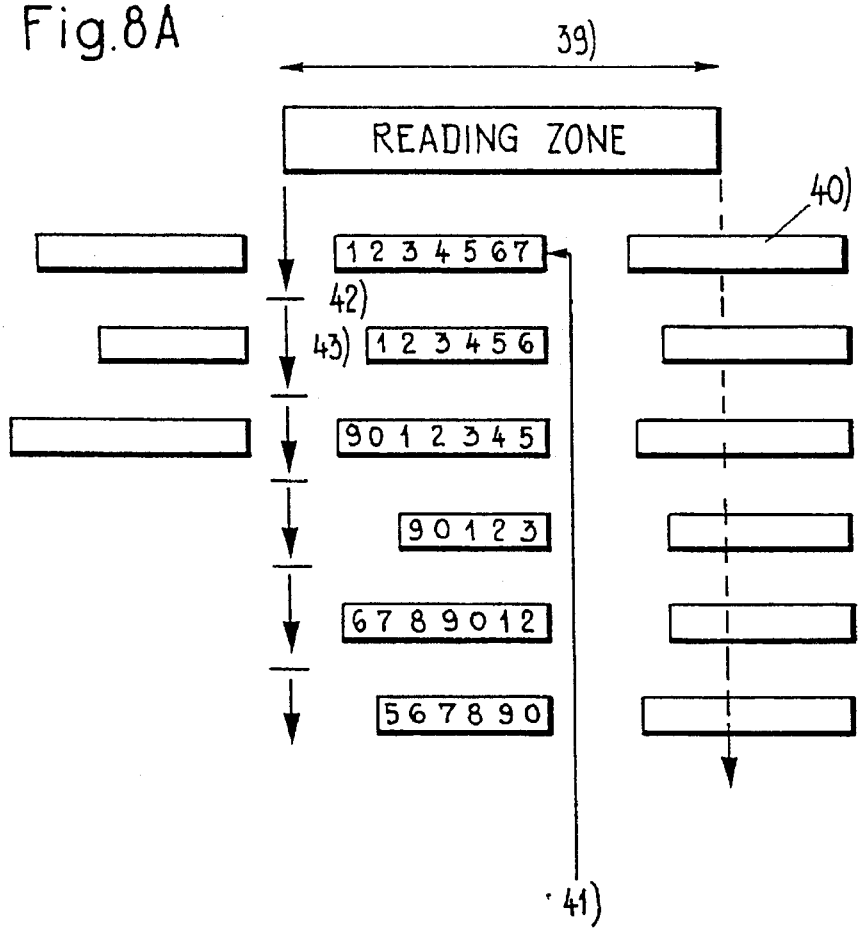
FIGS. 8A and 8B show an embodiment where interruptions automatically cause a delimiting of digits.
Figure 8B:
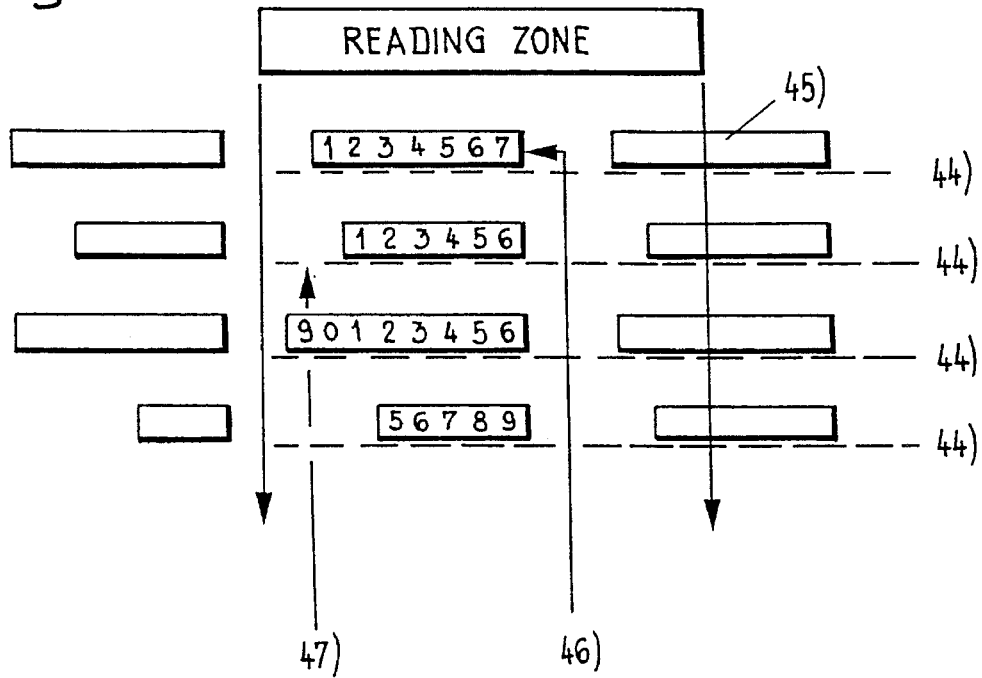

If an adjustable reading zone is not used, undesired numbers can be avoided by automatically triggering an interruption. In FIG. 8A, the delimiting 41 of the first number triggers an interruption in the recognition process so that no further figures, such as at 40 are included. After mechanical or electronic detection of an interruption in the recording movement, 42, or after the recognition of the number, the interruption in the arithmetic processing is cancelled so that a new number 43 can be input and processed. In a preferred method shown in FIG. 8B, a line 44 within the framework of the character recognition is sensed so that number 46 is first delimited in regard to this line. As soon as a new line 47 is found, the first delimited figure is processed and the operation continues with the next number. This method is suitable for vertically arranged numbers where other undesired numbers such as 45 are found on the same line.

For numbers which are recorded horizontally, there is a similar problem in that undesired numbers in a second row may also be recorded. In a similar fashion, a line sensing may be carried out with the processing being interrupted as soon as the line is recognized.

The advantage of this method is that only the relevant figures are entered even with a comparatively large reading zone and that this is done in a simple manner for the user. It is only necessary for the user to guide the reading zone so that the limiting of the reading zone to one size is used to correctly select the figures while everything else is performed automatically. Furthermore, the detection of vertical movement can trigger the interruption of the processing of the first figure found or the detection of the horizontal movement can trigger the interruption of the processing after the last figure of the first line.

The interruption in the movement of the reading zone can be detected in an electronic manner such as by noting that no more digits are recognized within a defined time interval.

Figure 9:
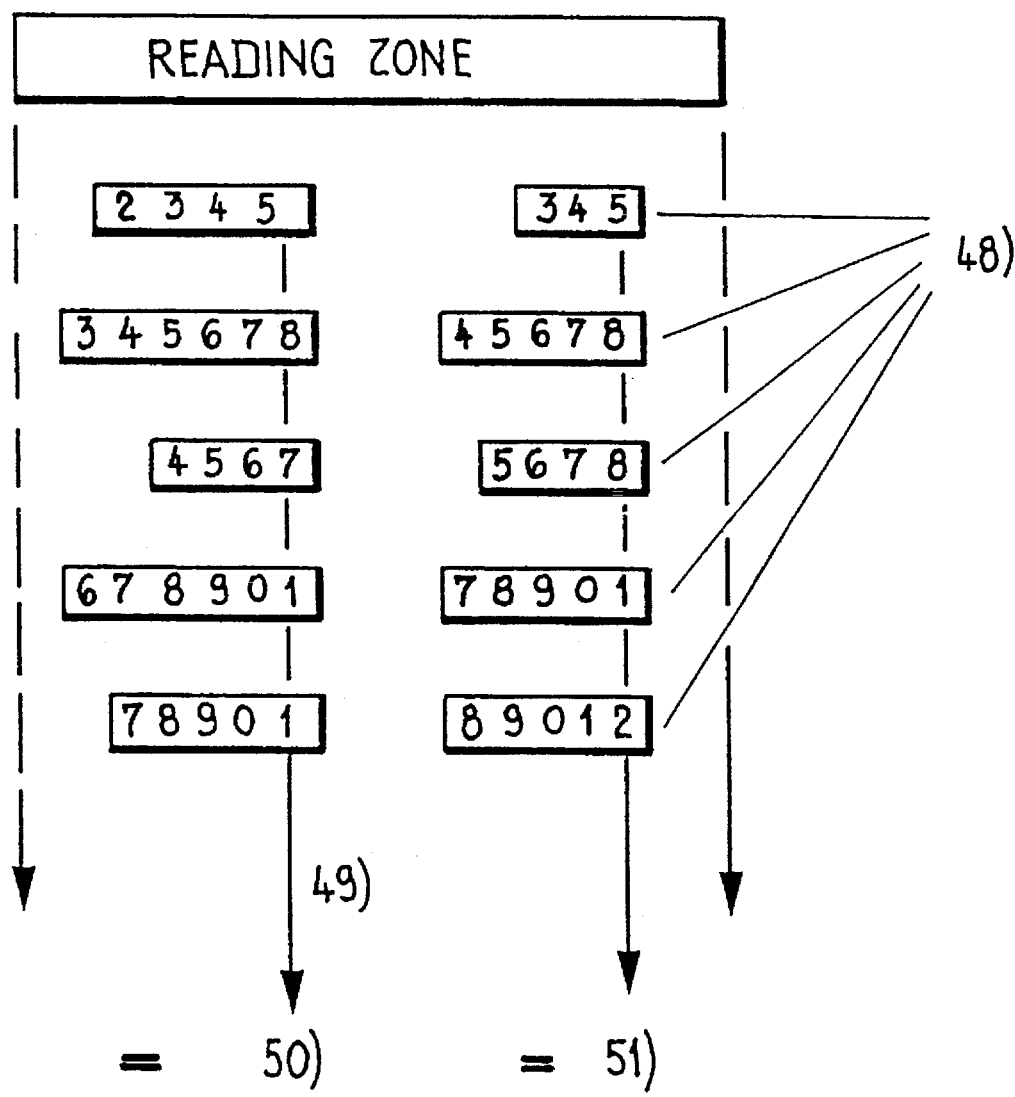
FIG. 9 shows an embodiment where two columns of numbers are added with the arithmetic operation being automatically applied.

In a further use of the present invention where the reading zone is larger than the relevant digits, all of the digits are first considered as part of the number even those which are not desired. If the numbers are ordered, for example, in two columns which are both within the reading zone, by way of a separate step, the combination direction is input by means of a key 49 (FIG. 9). The combination direction defines a direction in which the numbers are to be combined. Thus, if the numbers in a column are to be combined with one another not horizontally but vertically, the vertical key is pressed. The operation type can then be assigned to those numbers in the manner described previously. Thus, if addition is performed, the addition key may be pressed once and this can be assigned to all numbers of both columns. The total of the first column may be displayed by pressing a result key once and the total of the second column may be displayed by pressing the result key twice. Or, both totals can be displayed simultaneously.

It is also possible to perform these methods without the use of a screen in order to lower the cost of the device. It is also possible to display the results on another apparatus which is connected to the scanner, such as by using a personal computer.

The combination direction can also be determined by the type of movement direction or it can simultaneously determine the operation type. See FIG. 13. Diverse combinations are conceivable. For example, the input of the addition operation can also bring about vertical combination while the input of the multiplication operation can bring about a horizontal combination direction. Further, in the example above in which two columns of numbers were recognized and added in the vertical direction, pressing a key for the horizontal combination could trigger the horizontal addition.

Figure 12:
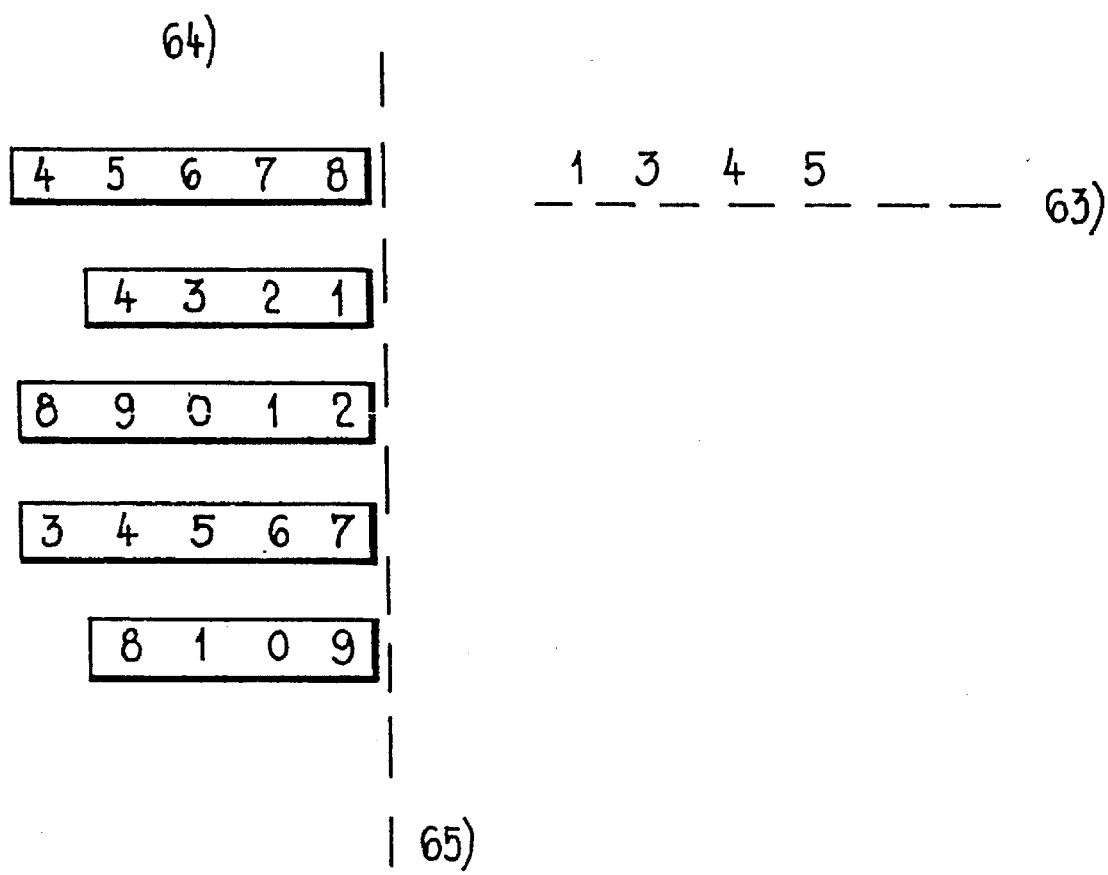
FIG. 12 shows the arrangement of numbers into relevant subsets.
Figure 13A:
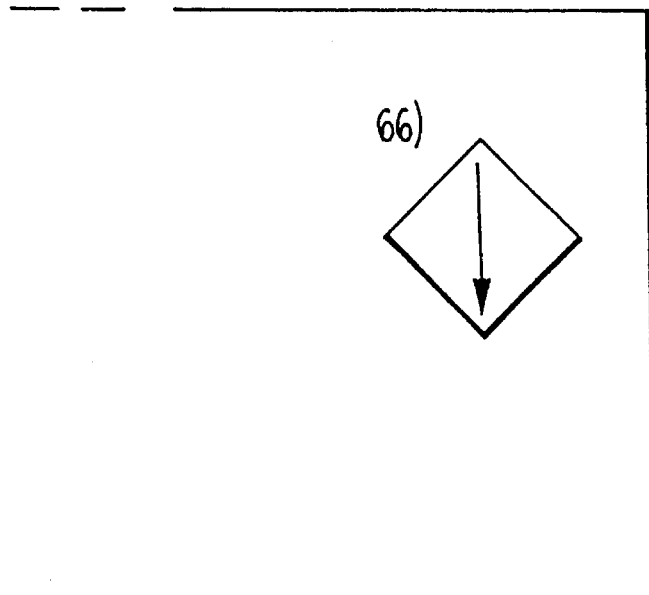
FIGS. 13A–13D show an indication of how direction affects the mathematical operation chosen.
Figure 13B:
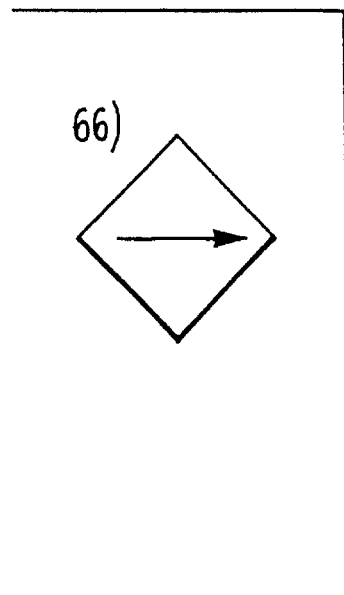
Figure 13C:
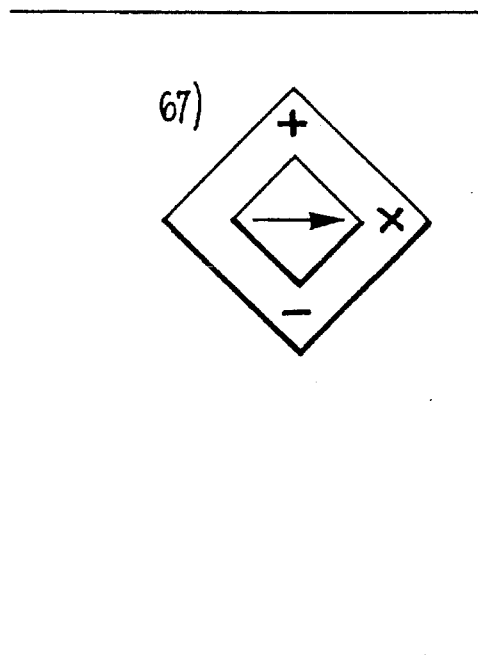
Figure 13D:
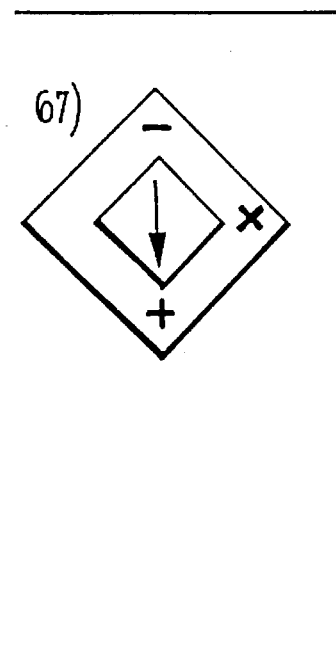

The combination direction is established in recognizing a set of figures which is divided either vertically or horizontally into relevant subsets. It is clear, however, such numbers must be ordered. Thus, some assignment must be possible in the horizontal direction, for example sensing a line, and likewise, the column must be sensed in the vertical direction within allowable deviations. A column sensing can be performed analogously to the line sensing carried out within the framework of the character recognition. The digits delimited as a number are viewed, for example as digit arrangements 64 shown in FIG. 12. Analogously to the line sensing, a common line is searched for these digit arrangements, not a horizontal line as with line sensing 63, but rather a vertical line 65 at the right edge of the numbers.

It is furthermore clear that according to the present invention how various types of combinations may be utilized. Thus, automatic delimitation can be combined with annular delimitation such as the following three modes.

1. a fully automatic mode in which the digits are input automatically and are automatically delimited as numbers;

2. a semiautomatic operating mode in which the digits are input manually but are automatically delimited as numbers; and 3. a conventional operating mode in which the digits are input manually and are manually delimited as numbers.

Checking the correctness of the figures which have been already been entered can be facilitated if a digit which does not meet the limit for recognition reliability is marked. A correction can then be made manually after being returned automatically to the questionable digit. In this manner, all questionable digits can be considered for correctness. It is also possible to facilitate checking by not only displaying the recognized figures on display, but also the digital or analog coded representation thereof. With this, the coded image of the figure can be enlarged and compared with the recognized figure.

I claim:

1. A method for adding a column of at least two vertically arranged numeric figures on a substrate each consisting of horizontally arranged digits, comprising the steps of:

providing an optical character recognition device, the reading zone of said device having at least a horizontal size of the numeric figures, said horizontal size being determined on the substrate by measuring in a horizontal direction from a first digit to a last digit of a numeric figure a space needed for all digits of a numeric figure on the substrate;

moving said reading zone across all vertically arranged numeric figures of the column by a single, uninterrupted movement, said movement being vertical to the horizontally arranged digits of each numeric figure;

recognizing the digits of a numeric figure after said vertical movement of the reading zone across the numeric figures has been started;

delimiting said digits to a numeric figure by a device for automatic delimitation, said device automating the delimitation by electronic methods for delimitation of written characters in a way that a manual instruction input is omitted at least after the point between a last digit of a fist numerical figure and a first digit of a second numeric figure of the column of at least two numeric figures;

applying an arithmetical operation mode "Addition" to each of the numeric figures after said automatic delimitation of the digits to a numeric figure by inputting the arithmetical operation "Addition" at most once.

2. A method according to claim 1 wherein the step of applying includes first storing temporarily said numeric figures in a memory and then applying said arithmetical operation mode "Addition" to each of the stored numeric figures by entering the operation instruction for the operation mode "Addition" only once.

3. The method according to claim 1, wherein the step of applying includes first storing said operation mode "Addition" in a circuit connected to an arithmetic unit and then applying the stored operation mode "Addition" automatically to each numeric figure upon automatic delimitation of each numeric figure.

4. The method according to claim 1, wherein the step of moving includes detecting a direction of said movement which determines which operation is input and wherein a downward movement indicates addition.

5. The method according to claim 1, wherein the step of moving includes detecting a direction of said movement which determines which operation is input and wherein an upward movement indicates addition.

6. An apparatus for adding a column of at least two vertically arranged numeric figures on a substrate each consisting of horizontally arranged digits comprising:

a) an arithmetic unit;

b) an optical character recognition device for inputting said numeric figures, a reading zone of said device having at least a horizontal size of the numeric figures, said horizontal size being determined on the substrate by measuring in a horizontal direction from a first digit to a last digit of a numeric figure a space needed for all digits of a numeric figure on the substrate;

c) a device for automatic delimitation of the numeric figures, said device automating the delimitation by electronic methods for delimitation of written characters in a way that a manual instruction input is omitted at least after the point between a last digit of a first numeric figure and a first digit of a second numeric figure of the column of at least two numeric figures;

d) an electronic device for applying by one instruction input at most an arithmetic operation mode "Addition" to each of the numeric figures of the column of at least two numeric figures.

7. The apparatus according to claim 6, wherein said electronic device comprises:

a memory to temporarily store the delimited numeric figures; and a circuit for applying by one instruction input, the arithmetic mode "Addition" to each of the stored figures.

8. An apparatus according to claim 6, wherein said electronic device comprises:

a circuit for storing the operation mode "Addition" before entering the numeric figures; and a circuit for applying the stored operation mode "Addition" to each of the numeric figures upon delimitation of a numeric figure.

9. The apparatus according to claim 6, wherein said electronic device comprises:

a detection device for detecting downward movement of the reading zone over a column of numeric figures; and a circuit connected to said arithmetic unit for indicating the operation mode "Addition" when a downward movement has been detected.

10. The apparatus according to claim 6, wherein said electronic device comprises:

a detection device for detecting an upward movement of the reading zone over the column of numeric figures; and a circuit connected to said arithmetic unit for indicating the operation mode "Addition" when an upward movement has been detected.

* * * * *